United States Patent [19]
Young et al.

[11] Patent Number: 5,242,604
[45] Date of Patent: Sep. 7, 1993

[54] LATERAL FLOW COALESCING MULTIPHASE PLATE SEPARATOR

[75] Inventors: Bobby W. Young, Louisville, Miss.; George M. Mraovich, Liberty, S.C.

[73] Assignee: Sudden Service Co., Louisville, Miss.

[21] Appl. No.: 819,411

[22] Filed: Jan. 10, 1992

[51] Int. Cl.$^5$ .............................................. B01D 21/24
[52] U.S. Cl. ..................................... 210/768; 210/519; 210/521; 210/802; 210/805; 210/DIG. 5
[58] Field of Search ............... 210/519, 521, 522, 802, 210/804, 805, 806, DIG. 5, 194, 197, 532.1, 768

[56] References Cited

U.S. PATENT DOCUMENTS

| | | | |
|---|---|---|---|
| 3,957,656 | 5/1976 | Castelli | 210/521 |
| 4,054,529 | 10/1977 | Pielkenrood | 210/521 |
| 4,247,312 | 1/1981 | Thakur et al. | 210/522 |
| 4,333,835 | 6/1982 | Lynch | 210/522 |
| 4,526,691 | 7/1985 | Melis | 210/521 |
| 4,643,834 | 2/1987 | Batutis | 210/522 |
| 4,722,800 | 2/1988 | Aymong | 210/521 |
| 5,173,195 | 12/1992 | Wright et al. | 210/802 |

*Primary Examiner*—Joseph W. Drodge
*Attorney, Agent, or Firm*—Marcus L. Bates

[57] ABSTRACT

Oil, water, and sludge are separated from a mixture thereof to provide waste oil, usable water, and concentrated sludge. The sludge can be further reduced in volume to facilitate disposal. The invention includes a system having a vessel with a coalescer supported therewithin to form an upper oil containment chamber at the top of the vessel, a contaminated water inlet chamber at one side, a lower sludge containing chamber at the bottom, and a treated water outlet chamber at the other side. The coalescer includes a number of corrugated plate members disposed parallel to one another and inclined respective to the horizontal. The corrugations of the plate members, when viewed in horizontal cross-section, form a sinusoidal wave pattern. There being a wide, long, thin, inclined, sinusoidal passageway formed between the plate members that extend from the inlet chamber to the outlet chamber. The oil separates and rises up the inclined troughs to the top of the vessel while the sludge separates and descends down the inclined troughs toward the bottom of the vessel while contaminated water is progressively cleaned and becomes separated water during its gentle flow along the parallel paths and into the outlet chamber while oil and sludge is removed from the mixture.

13 Claims, 3 Drawing Sheets

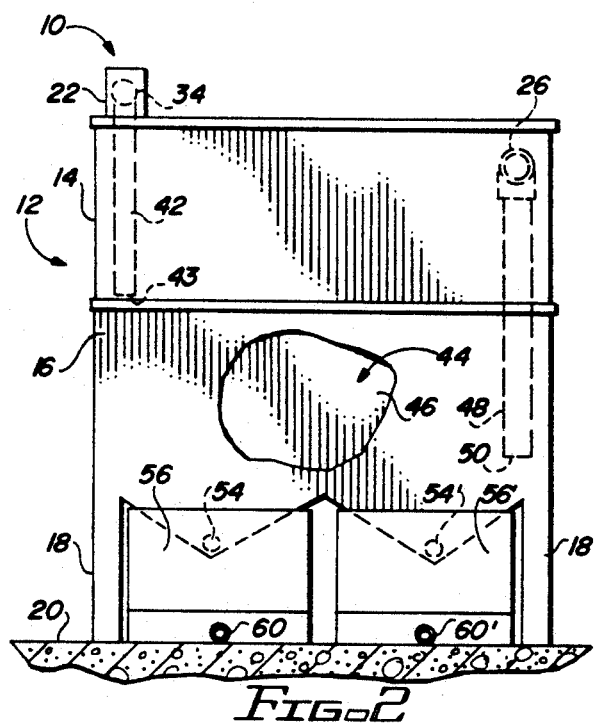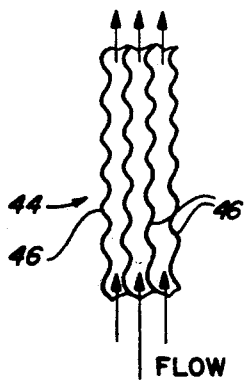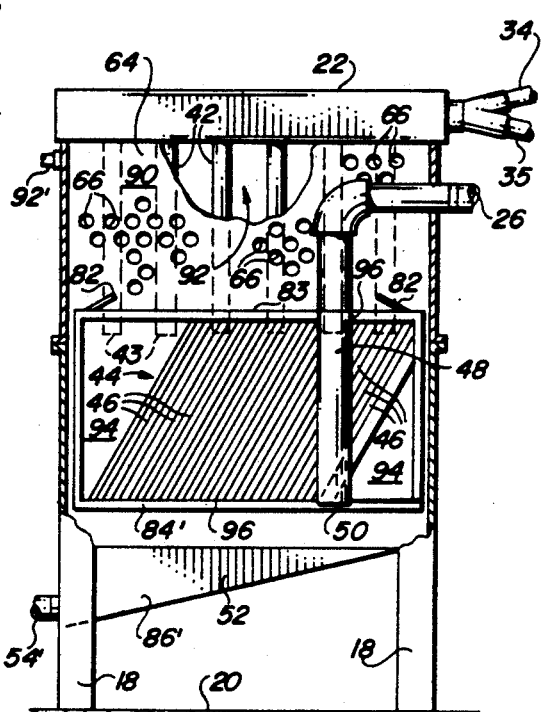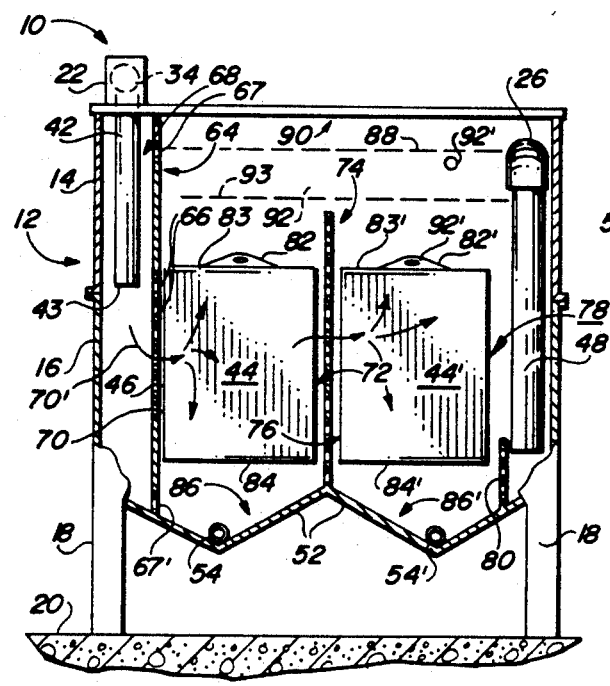

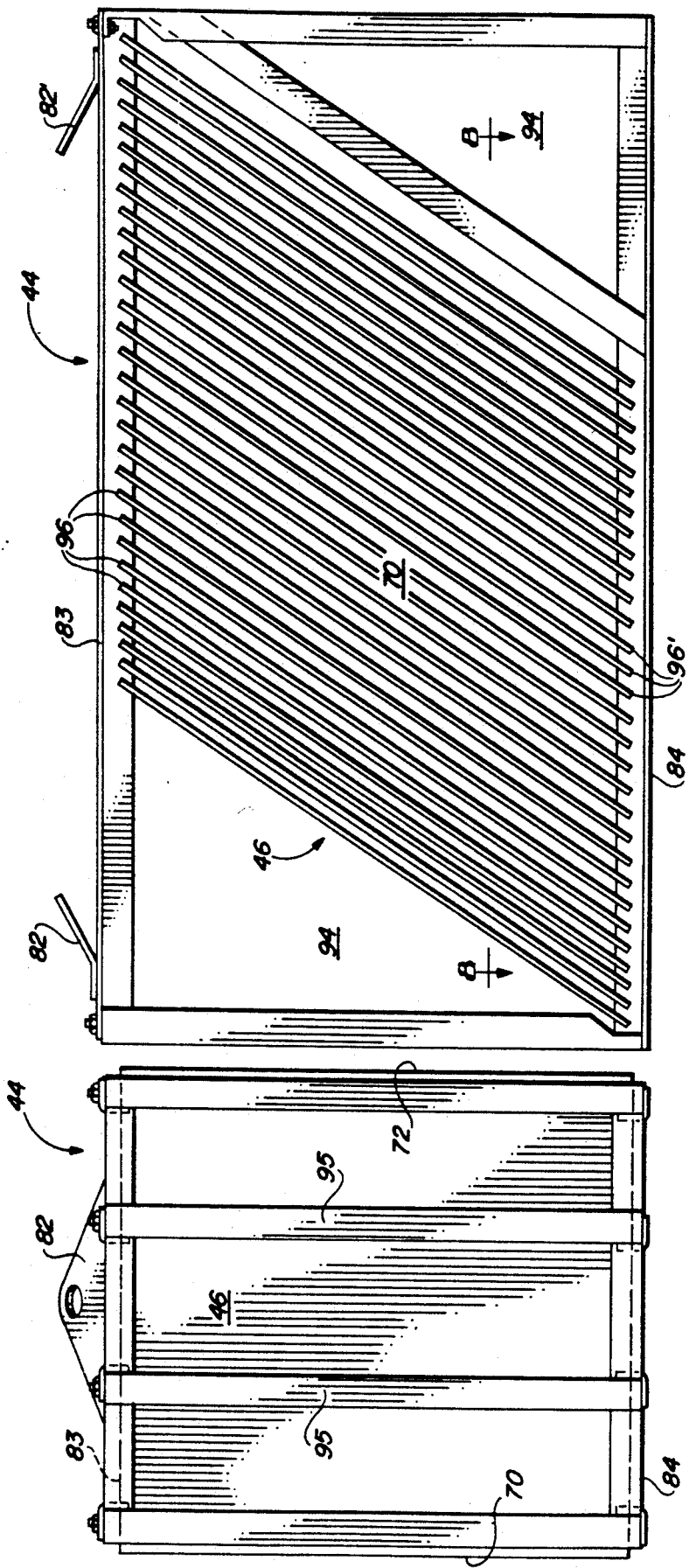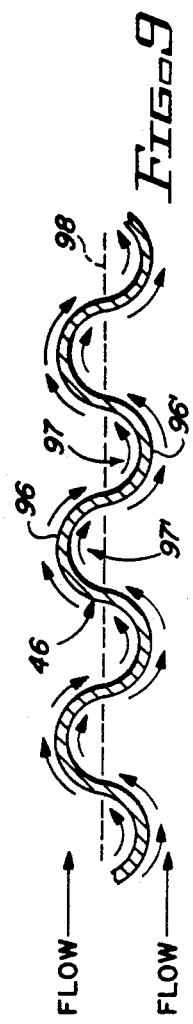

LATERAL FLOW COALESCING MULTIPHASE PLATE SEPARATOR

BACKGROUND OF THE INVENTION

The waste water from car washes, truck stops, machine shops, and other similar enterprises generate a multi-phase residue comprised of a lot of water admixed with a significant amount of oil, grease and sludge. Usually there will also be present detergents or surfactants that partially homogenize the mixture so that ordinary gravity separation does not remove all of the contaminants from the mixture. Therefore the mixture must not be released to find its way into the water table, or into flowing streams, because of the contamination of our natural resources.

Accordingly, it is desirable to have made available a system for economically handling this type waste material that efficiently separates the mixture into its various components, whereupon the treated water can be discharged or directly reused, the separated oil can be utilized as waste oil, and the resultant sludge can be accumulated and disposed of by approved means.

The system of this invention provides a novel coalescing multi-phase separator that includes a corrugated coalescer plate assembly and contains no moving parts and which provides a highly effective coalescing unit capable of performing the desired multi-phase separation. The apparatus of this invention preferably is used to separate a mixture of oil, water and solids that enter the coalescing multi-phase separator through a pump source and is distributed uniformly across a coalescing plate assembly.

The advantages of the present invention over existing prior art apparatus is the efficiency of operation, low cost of maintenance and disposal, and compactness of the unit. It easily can be mounted on a trailer for portability or installed as a stationary, permanent unit. Even though the unit is compact, the corrugations of the plate assembly maximizes the surface area for particle separation. The unit utilizes a static design having no moving parts, with a minimum rise and settling distance required for separated particles. The invention provides a vessel having an oil storage chamber and a sludge chamber contained therewithin. The invention further utilizes a non-plugging, corrugated coalescer plate assembly having no filament or the like to remove and clean or replace. The flow distribution is controlled by a unique distribution header that places an optimum static head on the coalescer plate assembly.

The coalescing multi-phase separator of the present invention is a very efficient device for separating multiphase material of different specific gravity, such as, for example, a mixture of oil, water and solids. The effectiveness of the coalescing multi-phase separator can be enhanced by the judicial use of treatment chemicals, injected upstream of the feed line, for streams that contain non-free floating oil and non-free settling solids.

SUMMARY OF THE INVENTION

This invention comprehends a system that includes a coalescing multi-phase separator apparatus which contains a coalescing plate assembly for performing multiphase separations. The apparatus preferably is used to separate a mixture of oil, water and solids that enter the coalescing multi-phase separator through an inlet having a suitable hydrostatic head. The mixture is distributed uniformly across a plate assembly of horizontal crossflow design.

The free floating hydrocarbons contained within the mixture are coalesced by contact with the extensive surface provided by the novel corrugated plate assembly of the coalescer. The hydrocarbons agglomerate on the surface of the corrugated plates and thereby increase to a size that allows a droplet of oil to achieve the necessary buoyancy to lift free of the plate field and rise along the troughs in the space formed between the adjacent plates to the surface. Once the particles of oil reach the surface they are allowed to accumulate and to be removed by any suitable means. The accumulated oil is suitable for recovery as waste heating oil, for example.

More specifically, this invention provides apparatus for separating a mixture of multi-phase substances into its phases and comprises a vessel for containing the mixture as it flows therethrough, a header is supported at the top of the vessel for receiving the mixture therein, and an inlet chamber is formed within the vessel at one side thereof, and an outlet chamber is formed within the vessel at the opposed side thereof.

A chamber opening is formed in the inlet chamber and the outlet chamber and the two chamber openings confront one another. A coalescer plate assembly includes a plurality of spaced parallel corrugated plates superimposed on one another in mounted relationship between the inlet chamber and outlet chamber. Flow is directed from the chamber opening of the inlet chamber into the inlet side of the plate assembly. The flow continues through the corrugated plate assembly to the outlet side thereof and into the chamber opening of the outlet chamber. A part of the vessel overlaying the plate assembly forms an oil accumulation chamber. A bottom chamber underlaying the plate assembly is formed for accumulating sludge therein. The outlet chamber is connected to receive treated water from the plate pack and an overflow connected to remove water from the outlet chamber. An oil outlet is connected to remove oil from the oil accumulation chamber.

Contaminated fluid that enters the header flows down into the inlet chamber, then horizontally through the multiplicity of spaces between the plates, and then into the outlet chamber as heavy material separates and flows down the troughs in the spaces into the sludge chamber while light material separates and flows up the troughs in the spaces into the oil accumulation chamber.

Accordingly, a primary object of the present invention is the provision of a coalescing multi-phase separator that contains no moving parts and is a highly effective coalescing unit capable of performing three phase separations.

Another object of the present invention is the provision of a coalescing multi-phase separator apparatus that can be used to separate a mixture of oil, water and solids.

A further object of this invention is the provision of a system for handling contaminated waste material, such as a mixture of water, oil, and sludge, that is separated into its components by the system, whereupon the treated water can be discharged or directly reused, the reclaimed oil can be utilized as waste oil, and the concentrated sludge can be accumulated and disposed of by approved means.

A still further object of this invention is the provision of apparatus for disposing of contaminated waste water by the provision of a vessel that includes a coalescing multi-phase separator therein that is capable of performing multiple phase separations, and can therefore be used to separate a mixture of oil, water and solids that enter thereinto into separate components which subsequently can be reused, and some of which is easily disposed of by conventional means.

These and other objects and advantages of the present invention will become readily apparent to those skilled in the art upon reading the following detailed description and claims and by referring tao the accompanying drawings.

The above objects are attained in accordance with the present invention by the provision of a method for use with apparatus fabricated in a manner substantially as described herein and illustrated in the accompanying drawings.

BRIEF DESCRIPTION OF THE DRAWINGS

FIG. 2 is a side view of the apparatus of FIG. 1, with some parts being broken away therefrom to disclose the interior thereof;

FIG. 4 is a part cross-sectional, detailed, side view of the apparatus of FIG. 2;

FIG. 5 is a part cross-sectional end view of the apparatus of FIG. 3, showing the opposite side thereof;

FIG. 6 is an enlarged detailed end view of part of the apparatus disclosed in FIGS. 4 and 5;

FIG. 7 is a side view of FIG. 6;

FIG. 8 is a partial cross-sectional view taken along line 8—8 of FIG. 7; and,

FIG. 9 is an enlarged, detailed, partial cross-sectional view of part of the apparatus of FIG. 8.

DETAILED DESCRIPTION OF THE PREFERRED EMBODIMENT

Figure 1:
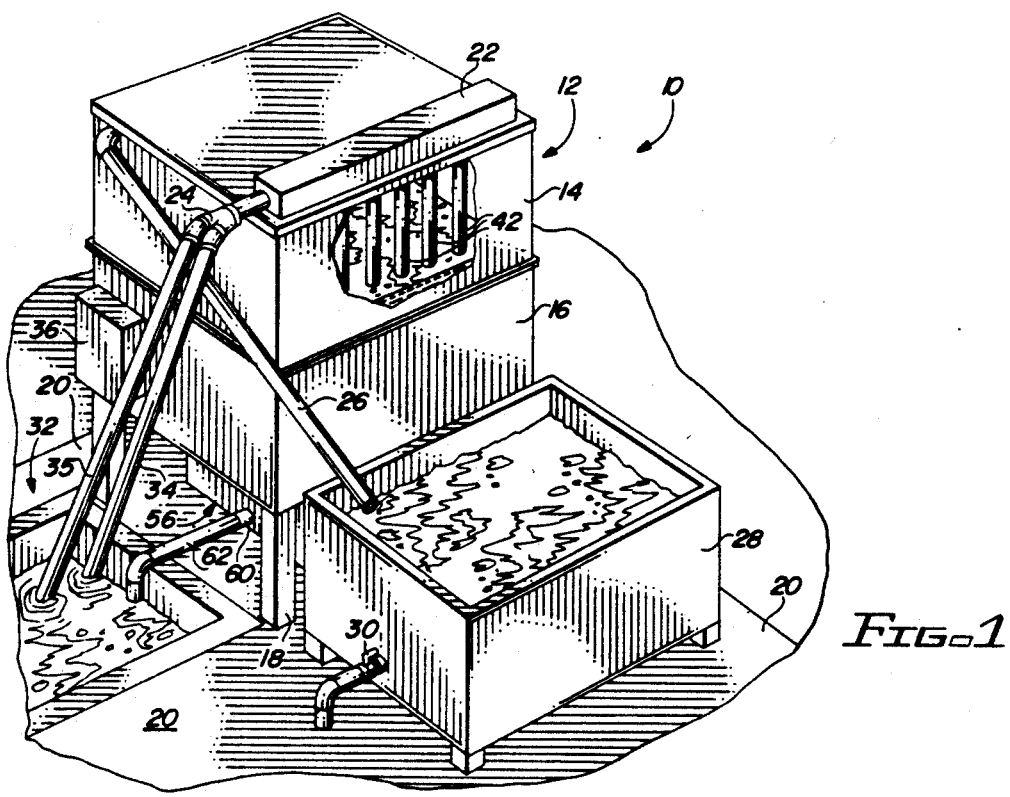
FIG. 1 is a perspective view of a system for separating a mixture, made in accordance with the present invention.
Figure 3:
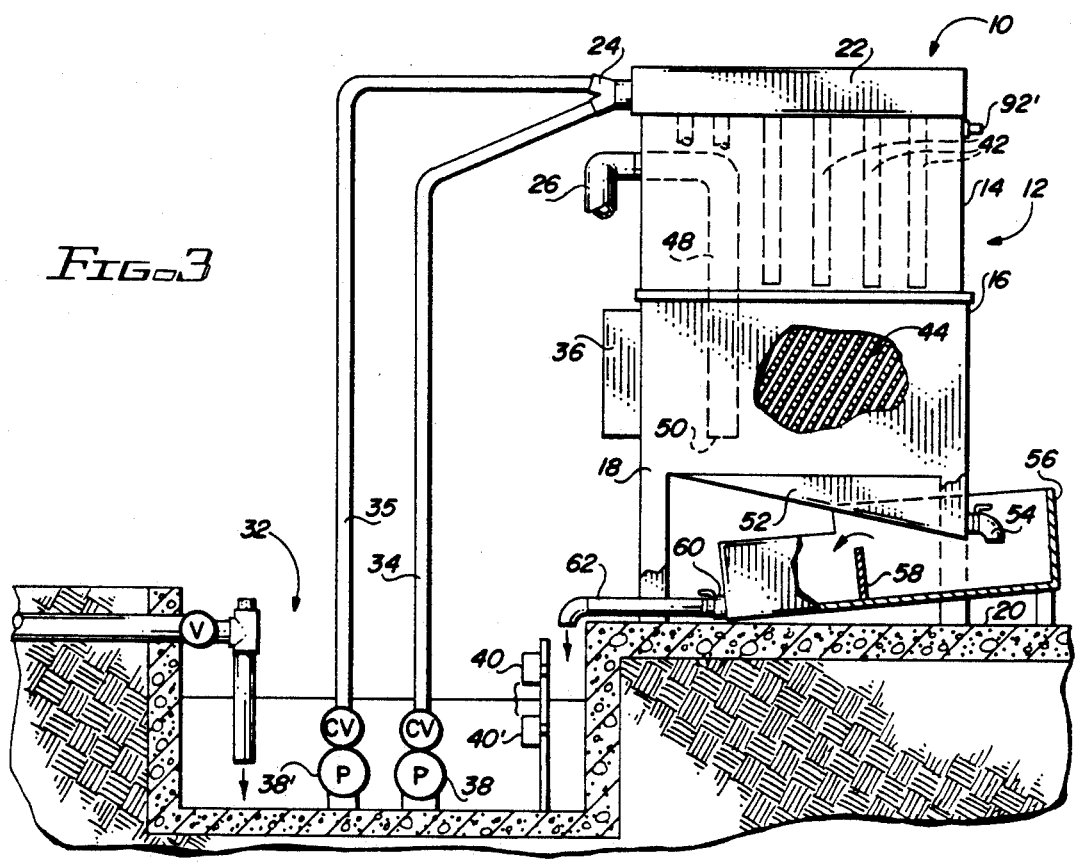
FIG. 3 is an end view of the apparatus disclosed in the foregoing figures, with some parts being broken away therefrom, and some of the remaining parts being shown in cross-section.

The figures of the drawings, and particularly FIGS. 1, 2 and 3, disclose a system, generally indicated by the arrow at numeral 10, for separating a multi-phase mixture. The system includes a vessel 12 having an upper end 14 and a lower end 16. The vessel 12 is supported by legs 18 on a suitable support pad 20. An inlet header 22 is supported at the upper end of vessel 12 and is connected to an inlet coupling 24 by which the multi-phase mixture flows into the header 22. The multi-phase mixture that flows into the header can be a number of contaminated liquids such as a mixture of water, oil, and sludge, for example, hereinafter called "contaminated feed water".

As particularly illustrated in FIGS. 1, 2 and 3, an overflow treated water outlet 26 transports treated water from vessel 12 and into an holding tank 28. The holding tank 28 discharges through flow line 30 for disposal or reuse, as may be desired. A pit 32 accumulates contaminated liquid therewithin that subsequently is used as contaminated feed water. The contaminated feed water contained in pit 32 is conveyed by separate parallel flow conduits 34 and 35 into the before mentioned inlet coupling 24. Control box 36, of known design, controls the operation of the pumps 38 and 38' in response to a pair of float actuated switches 40 and 40' arranged to maintain a predetermined range of liquid level in pit 32.

As shown in FIG. 4, together with other figures of the drawings, a plurality of downcomers 42 have an outlet 43 thereof placed below the upper end of a coalescer plate assembly 44, made in accordance with this invention. As shown in FIGS. 5, 6, 7 and 8, the coalescer plate assembly 44 has a plurality of corrugated plates 46 arranged parallel respective to one another and inclined in a transverse direction respective to the direction of the flow therethrough, and at approximately 60 degrees respective to the horizontal. A riser, in the form of a standpipe 48, is connected to provide flow into the before mentioned overflow treated water outlet 26. Inlet 50 of standpipe 48 is positioned adjacent the bottom of the coalescer plate assembly 44 and is placed adjacent the end wall opposite to the end wall at downcomers 42.

Below the coalescer plate assembly 44 is a sludge chamber 52 within which separated sludge is accumulated. The sludge chamber is provided with a sloped conical bottom that downwardly slopes toward a sludge outlet 54. As shown in FIG. 3, sludge tanks 56, 56' underlay the sludge outlets 54, 54' and include a baffle 58 therein for dewatering the sludge. The sludge tanks have an outlet 60 leading to a discharge 62 for return flow of accumulated water back into pit 32.

In FIGS. 4 and 5, a vertically disposed perforated baffle plate 64 is apertured at 66 and cooperates with the walls of vessel 12 to form a contaminated feed water inlet chamber 68 which is isolated from the remainder of the vessel interior such that the flow therefrom must occur through the apertures 66. Numeral 67 indicates an uppermost aperture while numeral 66' indicates a lowermost formed in the baffle 64. Numerals 44 and 44' represent a two stage separation coalescer plate assembly, each being individually, removably supported within the vessel 12. Coalescent plate assembly 44 has an entrance 70 (FIG. 7) for receiving flow from inlet chamber 68 through perforations 66, and an outlet 72 through which a partially separated mixture flows. A secondary apertured baffle plate 74 is interposed between the outlet 72 of coalescer plate assembly 44 and the inlet 76 of the other coalescer plate assembly 44'.

The coalescer plate assembly 44' has a treated water outlet 78. A short perforated third baffle plate 80 is positioned to form an outlet chamber within which the overflow riser 48 is positioned, with the intake 50 of the riser 48 being positioned below the upper edge of the baffle plate 80.

Lifting eyes 82, 82' facilitate removal of the coalescer plate assembly 44 and 44' from the interior of vessel 12. The top 83, 83' of the coalescer plate assembly 44 and 44' is spaced from the bottom 84, 84' thereof. Lower settlement chambers 86 and 86' underlay the bottom 84, 84' of the coalescer plate assemblies 44 and 44'. Liquid level 88 defines a vapor space 90. Oil space 92 is formed above interface 93 and the mixed liquid space 94 of FIG. 5. The collected oil overflows at 92' to a suitable storage facility. The plate members 46 are supported within a frame 83, 84, 95 by means of the illustrated slots 96 formed therein.

In operation, contaminated water is typically the carrier fluid from which the oil and solids are to be separated. The solids that are heavier than water separate in the plate assembly 44, 44' by settling to the surface of the next lower adjacent plate member and then slide down the inclined plate surface to the solids storage zone 86 that provides a static fluid containment vessel. The solids gravitate or drop away from the plate assembly 44 into storage, making room for additional solids to clear themselves from the coalescer plate assembly 44 as they are separated from the flowing mixture. From time to time, the accumulated solids are transferred by valve 54 into the sludge tank 56. The dewatered sludge can be removed from the tank and placed in drums, or further treated for volume reduction prior to disposal.

The water moves very slowly horizontally through the serpentine separations or spaces between the plates. The treated water exits at outlet 78 where it continues to flow through the outlet chamber of the collection system and enters intake 50 of riser 50 and continues through overflow 26 where it can be discharged into the holding tank 28, and is reused or discharged into a sewer.

The coalescer plate assembly 44 has a multiplicity of parallel corrugated plates arranged in spaced relationship respective to one another to provide a plurality of parallel, inclined, sinusoidal flow paths by which oil is induced to separate from the mixture and rise up the inclined spaces directly to the oil chamber at the top of the vessel while the sludge likewise separates and descends down the inclined spaces toward the bottom of the vessel, directly into the sludge chamber. Meanwhile, contaminated water is progressively cleaned as it becomes separated from the mixture during its quiescent flow through the parallel, serpentine paths and directly into the outlet chamber while oil and sludge is being removed from the mixture. The efficiency of operation is greatly enhanced by employment of the inclined corrugated plates which form the flow paths into an inclined, sinusoidal wave pattern when viewed in horizontal cross-section. This wave pattern causes the contaminated water more efficiently to contact the plate surface as it snakes its way along the corrugations, thereby greatly enhancing coalescing the oil into large floating drops.

The free floating oil of the mixture, being lighter than water, are coalesced into larger droplets by contact with the extensive surface provided by the corrugated plate assembly of the coalescer. Infinitesimal particles of the oil agglomerate on a the corrugated surface of the individual plates and increase in volume to a droplet size that floats the droplet free of the plate surface to rise along the corrugated space between adjacent plates to the surface due to its buoyancy. Once the oil reaches the surface it is allowed to accumulate in the static head zone for subsequent retrieval by decanting at overflow 92', or the oil above the oil/water interface can be continuously removed by using any suitable means. The accumulated oil is suitable for recovery.

The contaminated water moves with a very low Reynolds Number as it slowly migrates horizontally through the sinusoidal separations provided between the multiplicity of plates. The contaminated water flows more or less perpendicular to the upwardly inclined corrugations, or cross grain to the upwardly inclined corrugations, to achieve the unusual performance gained by this invention. The flowing contaminated water changes direction many times as it flows laterally across the corrugations before it exits as clean water through the illustrated collection system downstream of the plate assembly. The treated water can be reused or conveniently discharged into a sewer.

The discharge from the header tank downcomers opens within the inlet chamber at an elevation that is vertically aligned with the inlet into the plate assembly. Therefore it is necessary that the perforations 66 extend through the bottom, top and center of baffle 64 so that any sludge prematurely dropping out of the mixture can be translocated directly into the sludge chamber while the light weight material, including hydrocarbons and gases, can flow directly towards the oil accumulation chamber at the top of the vessel. Further, ample flow passages must be centrally located for quiescent flow into the adjacent intake of the coalescer plate assembly 44.

In one reduction to practice, a 0 to 100 gallon per minute unit having thirty nine, twenty gauge, corrugated plates were arranged in the illustrated manner of FIG. 6 and 7. The frame of the plate assembly measured 33 inches by 41 inches by 69 inches, with the plates being set on 1 inch centers, as shown. The corrugations, as seen in FIGS. 8 and 9, are in a sinusoidal wave form and therefore present openings of a serpentine configuration such that liquid flowing through the plate assembly is advantageously brought into intimate contact with the surface thereof as the mixture continually changes direction as it flows along its inclined, serpentine path. This action provides the unexpected advantage of greatly increasing the coalescing action and at the same time increases the surface area provided by the individual plates. The corrugations are similar in size and shape to an ordinary corrugated roof, as shown in FIGS. 8 and 9, for example.

It is necessary for the plates to be spaced at least ¼ inch apart in order to prevent plugging of the spaces with sludge. The 1 inch space used herein advantageously separates a stream of water, oil, and sludge and avoids obstruction of the spaces between the plates.

The stock pumps 38, 38' are also efficient blenders which homogenize the contaminated water before it is pumped into the header tank. Treatment chemicals can be added to the pit 32, as may be desired.

A filter material can be used to line the sludge tank 56. The accumulated solids can be transferred to a filter press and further dewatered, and then transferred into approved closed containers for suitable disposal. The apparatus of this invention provides a closed loop system from which treated water, waste oil, and dewatered sludge is produced.

We claim:

1. Apparatus by which a flowing stream of a mixture of multi-phase material is separated into its separate phases, comprising:

a vessel through which the mixture of multi-phase material can flow, said vessel having a header at the upper end thereof, an inlet connected to the header through which the mixture flows thereinto;

an inlet chamber formed within the vessel at one side of the vessel in underlying relationship respective to the header; a plurality of downcomers interconnecting said header and said inlet chamber; an outlet chamber formed within the vessel at the opposed side of the vessel; a riser connected to convey a first separated phase of the material away from said outlet chamber;

a chamber opening formed in the inlet chamber; a chamber opening formed in the outlet chamber; the chamber opening of the inlet chamber confronts the chamber opening of the outlet chamber; a coalescing multi-phase separator plate assembly having a plurality of spaced parallel plates superimposed respective to one another to form plate spaced therebetween, means mounting said plate assembly within said vessel to form an upper chamber thereabove and a lower chamber therebelow; said plates have opposed ends, a top opposed to a bottom, and opposed sides; said plates are inclined respective to the horizontal; said plates are corrugated and form a sinusoidal wave pattern when viewed in horizontal cross-section, thereby forming spaced, sinusoidal, inclined spaces through which the mixture flows;

said plate assembly receives flow from the inlet chamber into one end thereof and discharges a first separated material from the other end of said plate assembly and into the outlet chamber, while a second separated material ascends the plate spaces and discharges into said upper chamber, and a third separated material gravitates into said lower chamber;

a first perforated baffle supported within said vessel between the inlet chamber and the plate assembly, means mounting said perforated baffle to direct flow into said plate assembly; a second perforated baffle between the outlet chamber and the plate assembly, means mounting said second perforated baffle to direct flow into said outlet chamber;

whereby; multi-phase material enters the header and flows into the inlet chamber, where the material flows through the first baffle and horizontally through the spaces between the plates and is separated into a first separated phase which is discharged through the second baffle and into the outlet chamber, while a second separated phase flows up the spaces into the upper chamber and a third separated phase flows down the spaces into the lower chamber.

2. The apparatus of claim 1 wherein said plates are inclined to form an acute angle respective to the horizontal;

the multi-phase material entering the header is a mixture of oil, water, and sludge, and flows into the inlet chamber, where the multi-phase material flows through the first perforated baffle and horizontally through the spaces between the plates and is separated into water which is the first separated phase, and is discharged through the second perforated baffle and into the outlet chamber, while the second separated phase is oil and flows up the spaces between the plates and into the upper chamber, and the third separated phase is sludge which flows down the spaces into the lower chamber.

3. Apparatus by which a flowing stream of a mixture of multi-phase material is separated into its separate phases, comprising:

a vessel having a header at the top thereof, an inlet connected to the header through which the mixture can flow thereinto;

an inlet chamber; a plurality of downcomers interconnecting said header and said inlet chamber; an outlet chamber opposed to the inlet chamber; an outlet connected to convey a first separated material away from said outlet chamber;

an inlet chamber opening formed in the inlet chamber; an outlet chamber opening formed in the outlet chamber; the inlet chamber opening confronts the outlet chamber opening; a separator plate assembly having a plurality of spaced plates superimposed respective to one another to form plate spaces therebetween, means mounting said plate assembly within said vessel to form an upper chamber and a lower chamber; said plates have opposed ends, a top opposed to a bottom, and opposed sides; means forming an apertured baffle between said inlet chamber opening and one end of said plate assembly; means forming another apertured baffle between said outlet chamber opening and said other end of said plate assembly;

whereby; multi-phase material enters the header and flows into the inlet chamber, through the apertured baffle, into one end of the plate assembly, whereupon a first separated phase is discharged from the other end thereof and into the outlet chamber; a second separated phase ascends the plate spaces and discharges into said upper chamber, while a third separated phase gravitates into said lower chamber.

4. Method of treating a mixture of waste material containing water, hydrocarbons lighter than water, and sludge heavier than water, comprising the steps of:

dividing a vessel into an inlet chamber at one end thereof, an outlet chamber at the opposed end thereof, a hydrocarbon reservoir at the upper end thereof, and a sludge collector at the lower end thereof;

arranging spaced plates within said vessel to provide spaced, parallel flow paths that are upwardly inclined at an acute angle respective to the horizontal; upwardly opening the spaces between the plates into said hydrocarbon reservoir that is located at the upper end of the vessel, and downwardly opening the spaces between the plates into said sludge collector that is located at the lower end of the vessel;

placing a perforated baffle between the plates and the inlet chamber to admit flow of waste material from the inlet chamber, and, placing a perforated baffle between the plates and the outlet chamber to admit treated water to flow through the spaces between the plates and into the outlet chamber;

forming the plates into corrugations to present spaces having a sinusoidal wave pattern when viewed in horizontal cross section;

arranging the plates at an acute angle respective to the horizontal; and, extending the plates in the direction of flow from the inlet to the outlet chambers;

flowing the mixture in a downward direction into said inlet chamber of the vessel, through said perforated baffle, then horizontally along the sinusoidal flow paths formed through the plate members while oil flows upwardly at an inclined angle to engage the lower surface of the next adjacent plates and thereby coalesce and separate from the water, while sludge gravitates downwardly into contact with the upper surface of the next adjacent plates and thereby separate from the water and drop into said sludge chamber, and the separated water continues through the spaces formed between the spaced plates, and then into said outlet chamber where it is free to exit the vessel.

5. The method of claim 4 and further including the step of:

providing a driving force for the vessel by recirculating at least part of the separated water; arranging said plates at an acute angle of 55 to 65 degrees; and placing a sludge and water separator in underlying relationship to the sludge collector; separating the water and sludge and recirculating the separated water into the vessel to thereby reduce the volume of collected sludge.

6. The method of claim 4 and further including the step of:

flowing the separated water from the vessel by placing the intake of a riser in said outlet chamber at a location adjacent the lower end of the plates.

7. Method of claim 4 and further including the steps of:

placing a header on top of the vessel and flowing the mixture into the header; connecting a plurality of downcomers to the header with the downcomers discharging into the inlet chamber at a location adjacent the perforated baffle between the inlet chamber and the plates.

8. Method of claim 4 and further including the steps of:

placing a header on top of the vessel and flowing the mixture into the header; connecting a plurality of downcomers to the header with the downcomers discharging into the inlet chamber at a location adjacent the plates; placing the intake of a riser in said outlet chamber, and positioning the intake adjacent the lower end of the plates on the side of the vessel opposite to the downcomer.

9. Apparatus for separating a mixture of water contaminated with oil and sludge, comprising:

a vessel through which the mixture can flow; said vessel has a top, bottom, and opposed sides; a header supported at the top of the vessel for receiving the mixture therein; an inlet chamber formed within the vessel at one side of the vessel; an outlet chamber formed within the vessel at the opposed side of the vessel;

a chamber opening formed in the inlet chamber and a chamber opening formed in the outlet chamber, with the chamber opening of the inlet chamber confronting the chamber opening of the outlet chamber;

a multi-phase separator enclosed within said vessel, said separator having an assembly of a plurality of spaced, parallel, corrugated, adjacent plates superimposed respective to one another and mounted between the inlet chamber and outlet chambers for receiving flow of the mixture thereinto and discharging the separated mixture therefrom; said plates have opposed ends, a top opposed to a bottom, and opposed sides, thereby providing said separator with spaces which outwardly open at the opposed ends, top, and bottom of the plates such that the spaces each form a mixture inlet at one end thereof, a water outlet at the other end thereof, an oil outlet at the top thereof, and a sludge outlet at the bottom thereof;

means forming a perforated baffle between the inlet chamber opening and the plate assembly; said perforated baffle being mounted to direct flow into said plate assembly whereby flow can occur from the chamber opening of the inlet chamber into the inlet end of the coalescing separator; means forming a perforated baffle between the outlet chamber opening and the treated water outlet of the separator, said perforated baffle being mounted to direct flow from the outlet end of said separator into the outlet chamber opening;

an oil overflow at the top of the vessel overlying the separator; a sludge chamber underlying the separator for accumulating sludge therein; an overflow outlet connected to remove treated water from said outlet chamber; and an oil outlet connected to remove oil from the oil overflow at the top of the vessel;

said plate assembly having a frame within which a multiplicity of said corrugated plates are supported therein and arranged to form sinusoidal wave patterns when viewed in horizontal cross-section, thereby forming spaced, sinusoidal, inclined spaces through which the mixture flows; said plates are inclined at an acute angle respective to the horizontal;

whereby; a contaminated mixture enters the header and flows into the inlet chamber, through the perforated baffle and into the separator, and from the separator into the outlet chamber, as sludge separates and flows down into the sludge outlet while oil separates and flows up into the oil overflow.

10. The apparatus of claim 9 wherein the multi-phase separator plate assembly has a has a frame having slots for receiving the opposed marginal edges of the plate members;

said plates are arranged with the corrugations being aligned transverse to the direction of flow through the plate assembly.

11. The apparatus of claim 9 wherein the recited mixture flows horizontally along the sinusoidal flow paths formed through the plate members while oil flows upwardly at an inclined angle to engage the lower surface of the next adjacent plate members and thereby coalesce and separate from the water while sludge gravitates downwardly into contact with the upper surface of the next adjacent plate members and thereby separate oil from the water and drop sludge into said sludge chamber.

12. The apparatus of claim 11 and further including a plurality of standpipes forming downcomers into the inlet chamber through which said mixture of water, oil, and sludge is introduced; and a riser forming an outlet from the outlet chamber; there being an additional plate assembly with the two plate assemblies connected in series relationship so flow of contaminated water flows in series relationship therethrough.

13. The apparatus of claim 9 and further including mounting the plate members at an angle of about 60 degrees; and a sludge and water separator is mounted in underlying relationship respective to the sludge chamber by which the water and sludge is separated and the separated water is recirculated into the vessel to thereby reduce the volume of collected sludge.

* * * * *